March 31, 1942.   W. A. DARRAH   2,278,248
PROCESS AND APPARATUS FOR MONITORING GASES
Filed Dec. 6, 1939   2 Sheets-Sheet 1

Inventor
William A. Darrah

March 31, 1942.  W. A. DARRAH  2,278,248
PROCESS AND APPARATUS FOR MONITORING GASES
Filed Dec. 6, 1939   2 Sheets-Sheet 2

Inventor
William A. Darrah

Patented Mar. 31, 1942

2,278,248

UNITED STATES PATENT OFFICE 2,278,248

PROCESS AND APPARATUS FOR MONITORING GASES

William A. Darrah, Chicago, Ill.

Application December 6, 1939, Serial No. 309,373

9 Claims. (Cl. 177—311)

This invention relates to methods of monitoring various gases with the view of detecting the presence of certain objectionable gases when mixed with other gases.

Some of the objects of this invention are to detect traces of oxygen when mixed with other gases either inert or combustible.

Another object of this invention is to detect the presence of halogens and such corrosive gases as sulphur dioxide, hydrochloric acid, etc. when mixed with air or other gases.

Another important application of this equipment is to detect the presence of the so-called war gases.

Further object to which this invention may be applied is the detection and identification of various gases.

The equipment is designed in such a manner that it may give a signal or may actually operate certain equipment in case the gases to be detected occur within a predetermined ratio.

The equipment and process therefore has for one of its objects the approximate determination of the amount of the gases whose presence is to be detected.

I have broadly used the term monitoring to cover the continuous checking or testing of a sample of gas to accomplish the objects listed above.

Various other objects of this invention will be apparent from the specification, drawings and claims which are submitted herewith.

Referring to drawings

Fig. 1 indicates a typical circuit which may be used with my device although it should be understood that I do not wish to confine my invention to any single arrangement of equipment in a circuit as many forms of circuit may be used to accomplish the result desired.

Fig. 2 indicates a front elevation of one form of my invention enclosed in a protecting housing while Fig. 3 indicates a side view of this device.

Fig. 4 shows an alternative construction in which two sensitive elements are employed in a manner which will be described later.

Figure 2:
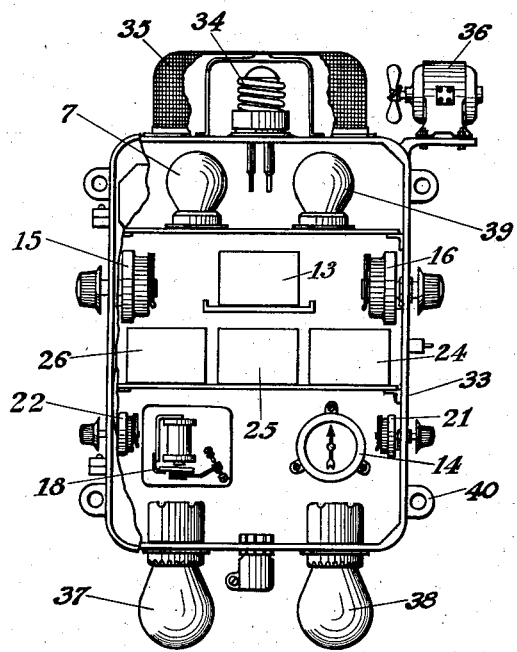

In describing my invention I prefer to use the term "gases of the oxidizing group" using this term in the sense in which it is used in physical chemistry to include such gases as chlorine, bromine and iodine, oxygen sulphur, etc. and the corrosive gases such as sulphur dioxide, hydrochloric acid, sulphuric acid, sulphur trioxide, hydrogen sulphide and numerous others.

Perhaps the simple test as to whether or not the gass falls into this class will be determined by whether or not the gas in question would cause the reaction later to be described as characteristic to my process and equipment.

In its simplest form my invention consists of two electrodes formed preferably of similar material and from materials which are normally relatively inert under the conditions to which they are subjected when acted upon the gas which is to be monitored.

For purposes of discussion I will employ a mixture of chlorine in air, it being understood that any of the other oxidizing or corrosive gases may be used in place of chlorine by making proper modifications in the nature of the electrodes, the electrolite and other portions of the device.

It is also well understood that most of the war gases rapidly dissociate setting free either hydrochloric acid or chlorine and that this action is one of the important means whereby my device will indicate the presence of minute traces of war gases in air.

In principle the two electrodes are separated mechanically from each other but are immersed in a conducting medium which may be either a liquid, a jelly or a solid.

For purposes of simplicity in describing my invention I will discuss two electrodes using for example silver as a metal. The electrodes may be immersed in a solution containing potassium chloride with some hygroscopic material as for example glycerine.

I wish to be understood that in addition to glycerine a wide range of other hygroscopic materials may be used as for example diethylene glycol, calcium chloride, phosphoric acid and the various hypochlorates, sulphuric acid and even such materials as activated charcoal, actuated aluminum, silica gel, etc.

The object of the hygroscopic material is to prevent the complete evaporation of the moisture from the electrolite between the electrodes which would reduce the sensitivity of my equipment.

It should be understood that as electrodes I may use carbon filaments or rods, chrome iron, nickel, platinum, copper, monel and a wide range of relatively stable metals. It is possible to use ordinary steel or iron wire but because of the tendency for oxidation or rusting this material as well as others in this class are objectionable. Aluminum may be used with excellent results by proper selection of the electrolite.

I prefer to place between the electrodes an insulating but porous separating wall. This material may be of such nature as asbestos sheets, glass cloth sheets, paper, porous porcelain, parchment or other equivalent materials.

One arrangement that I have found practical consists in coating the inner electrode with a thin layer of cement such as gypsum, oxy-chloride or Portland cement and adding the electrolite material to this cement.

The cement then serves as a mechanical separator for the two electrodes and is a support or wick to keep the liquid in contact with both electrodes.

For great accuracy I prefer to place a thin walled glass tube around the central electrode but this is not necessary in many cases. The thin walled glass tube increases the life of the electrode but in most cases after each indication a new electrode assembly can readily be inserted into the device thus making the matter of repeated operation of small importance.

Referring to the drawings, 1 indicates the inner electrode and 2 indicates the outer electrode. 3 indicates the porous medium and 4 indicates an optional glass wall around the inner electrode. 5 indicates a support or container which may be formed of some convenient insulating material such as glass or some of the synthetic plastics.

5 may be made integrally with the glass separating tube 4 if desired thus forming a very convenient and inexpensive construction.

A well or reservoir 6 is provided near the lower portion of the sensitive electrode assembly for the storage of a sufficient amount of electrolite to insure that the equipment is in operative condition for a sufficiently long period without attention.

The same electrolite may preferably be used within the glass tube 4 and on the wick member 3 although in certain cases later to be described I wish to vary the composition of the electrolite in contact with electrode 1 from that in contact with electrode 2. Electrode 2 is preferably made in a form to present a large surface to the gas to be monitored. One convenient arrangement is to coil a relatively fine wire tightly about the wick member 3.

Another alternate equally satisfactory is to wrap a gauze or screen cloth tightly around wick 3. It is desired to expose a relatively large surface of electrode 2 both to the gas to be monitored and the liquid in the wick 3 in order to obtain the maximum sensitivity.

It should be understood that in describing the electrolite used I endeavor to obtain a solution which is relatively inert on both electrodes so as to not cause rapid deterioration when not used. I also wish to have the liquid a moderate conductor of electricity and to contain a hygroscopic material as outlined above. While a mixture of glycerine and potassium chloride may be used to advantage with silver electrodes I prefer in the case of aluminum electrodes to use a mixture of hypochlorate and sodium nitrate in water solution as these materials are relatively inert on aluminum once the protecting oxide film is produced.

The concentration of these materials may be very low. It is obviously desirable to select materials which would not be substantially acted upon by the normal components of the gas to be monitored but which may be readily acted upon by the gas which is to be detected. Thus a mixture of sodium nitrate and sodium carbonate in diethylene glycol may be used in air as none of these materials will be greatly affected by either the oxygen or the nitrogen or the small traces of carbon dioxide which are normally found in air. On the other hand if the device is to be used to detect traces of oxygen in an atmosphere of methane, or hydrogen I would prefer to add substantial amounts of some readily oxidized material such as pyrogallic acid which would be unaffected by hydrogen, methane, etc. but would be readily oxidized by slight traces of oxygen.

Figure 1:
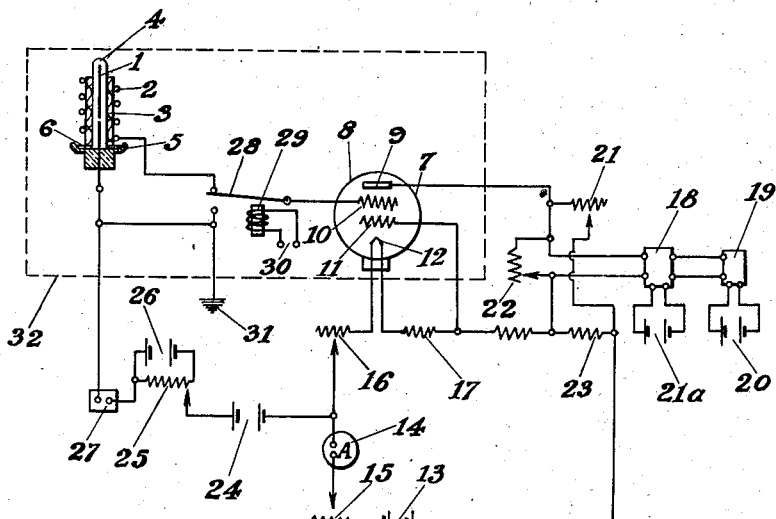

In one of the simpler forms of my device as illustrated in Figure 1 the outer and inner electrodes are connected to an amplifying tube 7. Tube 7 represents a standard commercial amplifier, and for purposes of discussion may be considered as formed from a glass container 8 enclosing a plate 9, two grids 10 and 11 and the filament 12. The filament is heated by current from a battery 13 which may be measured if desired by ammeter 14 and controlled by variable resistances 15 and 16. Fixed resistance 17 serves to apply a controlled potential on grid 11 while grid 10 receives the potential difference generated between electrodes 1 and 2.

The current from plate 9 of course follows closely the potential generated between electrodes 1 and 2 is applied to further amplifying device 18 which in turn actuates a signal such as a bell or light indicated diagrammatically by 19. 20 indicates a source of power for signal 19, and 21A indicates a source of power for amplifier 18.

It will of course be understood that the additional amplifier 18 may be eliminated if desired and the current from plate 9 may be applied directly to a relay 19.

Resistances 21, 22 and 23 serve to control the effect of the current from plate 9 on amplifier 18 or on signal relay 19. These resistances are optional and may be omitted in simple forms of my device. They are helpful in calibrating my device for operation only at a predetermined concentration.

24 indicates a source of potential which may be used to give a bias to the grid to obtain the maximum sensitivity. Resistance 25 and potential source 26 serves as further biasing and adjusting means to neutralize the normal potential between electrodes 1 and 2. 27 indicates a potentiometer serving a similar purpose and it should be understood that many of these refinements may be omitted without departing from the spirit of my invention. 28 indicates a switch actuated by an electric magnet 29 from a source of current 30. It should be understood that the purpose of switch 28 is to alternately connect the potential between electrodes 1 and 2 first and between grid 10 and filament 12 and then connect grid 10 with the ground 31. Switch 29 may be operated by a motor, clock work, or other device or the switch may be allowed to remain closed in which case a constant potential will be applied to grid 10. The use of a rapid opening and closing of switch 28 is helpful in generating a pulsating current which may be amplified to a larger degree with more accuracy than the simple direct current.

The dotted lines marked 32 indicate a shield or ground which is intended to close the sensitive part of the circuit and eliminate or greatly reduce outside fields which in a device of this kind because of the degree of amplification may cause false signals.

Figure 3:
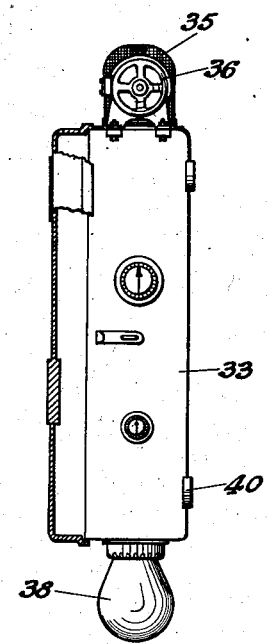

Referring to Figures 2 and 3 a case 33 is shown enclosing the equipment indicated diagrammatically in the circuit of Figure 1. In this figure the sensitive pair of electrodes is indicated by numeral 34 which is enclosed in the metal grating screen 35 which serves as an electrostatic shield as well as for mechanical protection. A small fan 36 indicates means for moving the gas to be monitored positively in contact with the sensitive element 34.

37 indicates a signal light which may for example be green to indicate that the gas to be monitored does not contain the dangerous ingredient while 38 indicates a red signal light which would be automatically lighted when green signal light 37 is extinguished when the device operates.

In Figure 2, 7 indicates the initial amplifying tube and 39 an additional tube used for further amplification. Obviously as many of these amplifiers as may be desired may be inserted in the equipment.

Various resistances and other equipment as described in Figure 1 are mounted within the case 33 as indicated.

Case 33 is of course provided with a suitable cover and may be mounted by means of lugs 40 on a wall or post.

It should be understood that where desired transformers may be employed instead of the batteries described in connection with Figure 1 and the whole equipment or any part of it in this case will be operated from a commercial power circuit.

Figure 4:
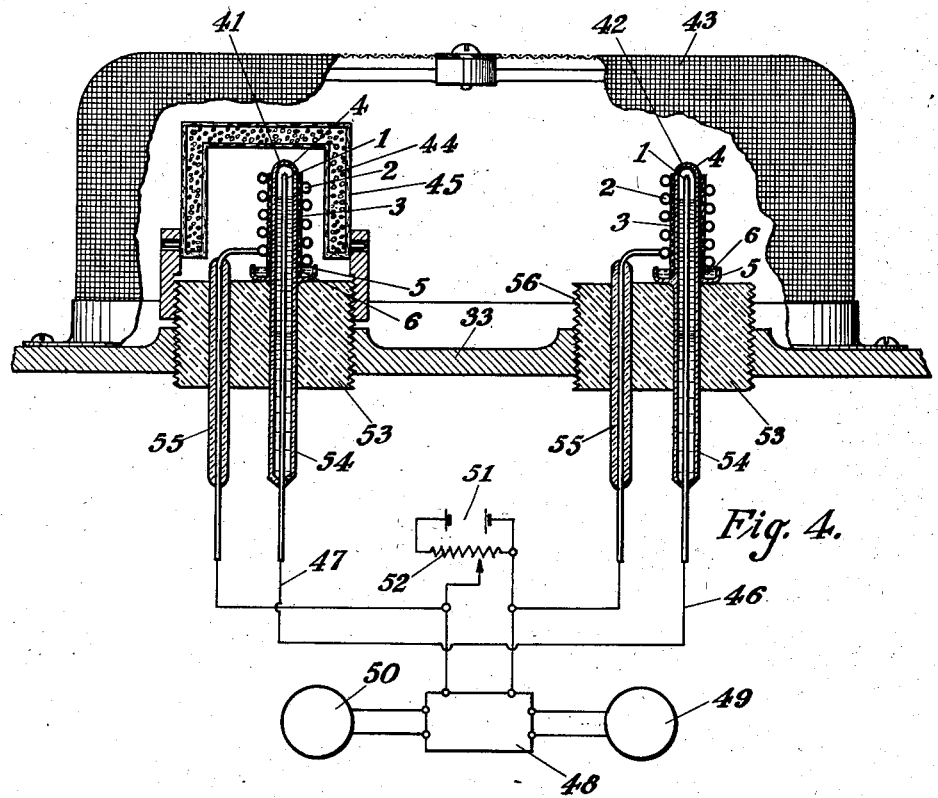
Fig. 4 shows an enlarged view of a portion of my device illustrating particularly the sensitive detecting elements and the circuit which may be used in connection with them.

Referring to Figure 4 this indicates diagrammatically the upper portion of the housing 33 shown in Figures 2 and 3. This, however, is an alternate form in which two sensitive electrode elements numbered respectively 41 and 42 are mounted in an electrostatic shielding frame 43. It will be understood also that the frames 35 and 43 serve to protect the electrodes from mechanical damage and handling.

In Figure 4 it is assumed that the two electrodes are identical one with the other except that electrode 41 is enclosed in a porous shield or filter 44.

This filter is arranged to be porous and permit passage of the gas to be monitored but to absorb certain objectionable elements so that electrode element 41 while subjected to the same temperature, pressure and gases as electrode element 42 yet 42 will be subjected to the deleterious ingredient which it is desired to detect whereas electrode assembly 41 will be shielded from this ingredient by the filter.

The filter may be formed from any of the commercial materials used in gas masks, for example such as activated charcoal, etc., it may be enclosed in a filter paper capsule 45 which if desired may be coated with cadmium oxide or similar absorbent for certain of the war gases. The object desired in the case of the two identical electrode assemblies is to expose one to the gas to be monitored plus the deleterious gas. These two electrode assemblies are then balanced one against the other and connected so that the internal electrode 46 is opposed to the internal electrode 47 and the difference of potential between the two electrodes is applied to amplifier system 48 which serves to operate indicator 49 or signal 50. Source of potential 51 and variable resistance 52 serve to balance the potential from electrodes assembly 41 and 42 when the equipment is initially set up.

Figure 4 shows diagrammatically one method of constructing the electrode assembly in which 53 is a plug or support which carries insulating tubes 54 and 55 which surround the two electrodes respectively. Plug 53 may be provided with threads 56 or other means for supporting it in the housing 33. The construction offered provides means for readily removing a damaged or used electrode assembly and inserting a new electrode assembly as required.

Similar numbers indicate similar parts in the various figures.

Figure 5:
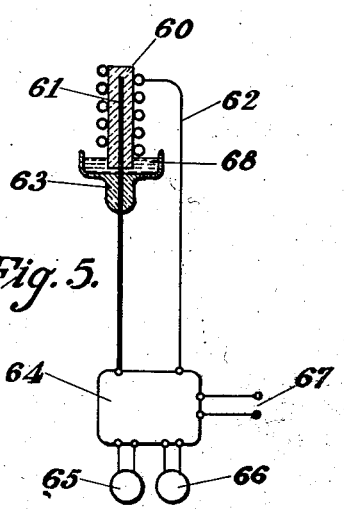
Figs. 5 and 6 show diagrammatic arrangements and alternative arrangements which may be employed within the scope of my invention.

Referring to Fig. 5 I have shown diagrammatically one form of construction of the sensitive element. In Fig. 5, 60 indicates a tube or shell which surrounds central electrode 61. The outer electrode 62 is formed in contact with tube 60 and may be either in the form of a wire wrapped around 60, a screen or mesh, or any other convenient manner of making fairly good electrical contact to the surface of tube 60.

63 indicates a support for the unit which is preferably of insulating material and provides a reservoir or holder for the supply of electrolite and indicates the amplifier mechanism and the auxiliaries while 65 indicates one of the signal lights and 66 the other signal light. 67 indicates a source of power for operating the equipment.

Referring to the electrode assembly and particularly the tube 60 I have found that this can be constructed to advantage of a material similar to porous porcelain or clay which will act as a wick and hold within its pores a substantial amount of the electrolite. Tube 60 should be constructed so that it makes close contact with the inner element or electrode 61 so that electrodes 61 and 62 are mechanically spaced apart but at all times some portion of them is contacting the electrolite. The degree of porosity is not of great importance but the more resistance which the material 60 offers to the flow of liquid the more effective the unit in general.

As in the case of the other elements described the active gas or ingredient in the gas causes a change in the electrolite in contact with the electrode 62 while, because of the slow rate of diffusion through the tube 60, there is no immediate change in the composition of the electrolite in contact with electrode 61. The difference in composition of the electrolite around the two electrodes causes a minute potential difference which when amplified operates the unit.

Figure 6:
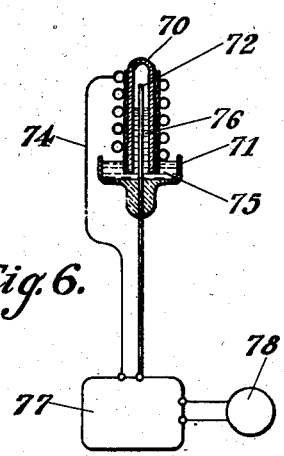

Referring to Fig. 6, 70 indicates a glass or insulated tube which is supported, slightly spaced away from reservoir or container 71 which in turn supports central electrode 72. A wick member of cloth or other porous material 73 surrounds a portion of the surface of tube 70. A second electrode 74 is formed closely in contact to the wick member. The wick member dips into the supply of electrolite 75 in reservoir 71. A portion of the electrolite in reservoir 71 is carried upward into tube 70 as indicated by 76 and surrounds electrode 72 making contact between electrode 72 and the glass tube 70.

77 indicates the amplifier unit and 78 a sensitive unit actuated by the amplifier.

It will be noted that the internal resistance of the modifications shown in Figures 5 and 6 is substantially less than the internal resistance of the devices illustrated in Figures 1 and 4 which fits these alternate types of construction for detecting certain larger concentrations to good advantage while the high internal resistant types are well suited for detecting extremely small concentrations of special ingredients.

It should be understood that the ingredients to be detected while carried or supported by the gas to be monitored does not of necessity have to be a gas as it may be a suspended solid, suspended drops of liquid or a mixed vapor.

In operating my device I found it advantageous to have the two electrodes so arranged that one is in contact with a portion of the electrolyte which is well shielded from the gas to be monitored while the other electrode is in contact with a portion of the electrolyte which is thoroughly exposed to the gas to be monitored.

A fan, pump, or other device may be used to insure a rapid motion of the gases to be monitored over the sensitive element or if desired the apparatus may be allowed to operate by the diffusion currents which are almost always present in most gases.

I wish to be understood that the apparatus and process which I have invented has a wide range of applications and I desire to select the exact composition of the electrolyte and electrode best suited for each particular application.

I have employed a hygroscopic material in the electrolyte in order that it may be exposed to the gas to be monitored without having the moisture so far removed from the electrolyte that it is no longer effective.

I have also found that for practical reasons the electrolyte performed most satisfactorily when it contains a thickening medium such as starch, gelatine, clay or fibers. Thus an electrolyte formed from starch paste, glycerol and potassium chloride is slow to dry and yet active in indicating the presence of various war gases which contain chlorine or bromine.

In order to guard against the operation of the device by the presence of carbon dioxide which occurs in the air in varying quantities I prefer to add to the electrolyte small amounts of a soluble carbonate as for example sodium or potassium carbonate. The carbonate ion thus added to the electrolyte so far out-balances any small additions of carbon dioxide which may come from normal air that the device is not therefore sensitive to this change. On the other hand by omitting carbonates in the electrolyte I can make a detector which will readily indicate the presence of traces of carbon dioxide in air or various other gases.

As an example of the flexibility of my device if I wish to detect the presence of oxygen in a gas containing principally reducing gases such as hydrogen, methane, etc. and normally free from oxygen I add substantial amounts of a strongly reducing substance such as pyrogallic acid in a slightly alkaline solution to the electrolyte. The hygroscopic agent is helpful in this case to prevent loss of water. A cell or detecting unit such as described and using the electrolyte containing pyrogallic acid will give a strong indication of the presence of oxygen or oxidizing gases.

By using in the electrolyte a small amount of potassium iodide it is possible to get a marked indication of the presence of ozone without indications from ordinary oxygen.

The presence of potassium iodide also makes a sensitive indicator for chlorine or bromine.

Lithium chloride has been found very helpful as a medium in the electrolyte in that it serves to retain moisture persistently (hygroscopic). One method of using my invention as a means of determining the amounts of various ingredients to be detected is to place in the electrolyte, which is sealed away from the gas to be monitored, a small amount of material to be detected. Thus in the case of using the device to determine roughly quantitative measurement of the amount of the chlorine gas I add a small amount of free chlorine within the glass tube 4 of Figure 1. Then by balancing the electromotive force which results by potentiometer 27 or biasing potentials, and bring the device back to zero.

As the outer electrolyte acquires chlorine from the gas to be monitored it will gradually build up a potential which will neutralize that produced by the chlorine between electrodes 1 and 2. As this potential is neutralized the fixed potential of the potentiometer of bias cell is no longer neutralized and the device gives an indication. If desired I may use as a relay some of the standard types of milli-ammeters in which the contact which actuates the signal device is formed between the pointer of the milli-ammeter and the movable contact. This is standard equipment already available on the open market and its application is described as indicating means for calibrating my device so that the signal will be actuated when a given concentration of substance to be detected is reached.

It should be noted that with the equipment which I have invented as set forth in this application it is possible to detect many gases when they are present only in a few parts per million in another gas.

The degree of sensitivity of course depends upon the nature of the gas being monitored and the material which is to be detected.

In the claims I have used the term "deleterious material" to indicate the substance whose presence is to be detected. The so-called deleterious material may vary widely with the nature of the gas being monitored. For example in monitoring fuel gases or atmospheres around oils or combustible materials oxygen would be considered a deleterious material. This would be detected with a strong reducing agent as previously explained.

In the case of monitoring air the deleterious material might be chlorine, hydrochloric acid, or some of the war gases which it is well known are in many cases not necessarily gases as used but small particles of rather volatile solids.

In these cases particularly where chlorine is present the sensitive electrolyte would respond by the action of chlorine which would dissociate from these materials. In certain cases I may add substances to the electrolyte to hasten the dissociation of some of the war gases. Thus aniline or some of the numerous organic hydroxyls may be employed. Since the dissociating agent would vary with the material to be detected I wish to claim broadly the use of a dissociating material and not the wide list of specific ingredients.

In the case of detecting traces of alcohol, ether, etc. in gases as for example in spray rooms or lacquer rooms I use in the electrolyte an oxidizing medium as for example chromic acid, potassium permanganate etc. which is not particularly affected by air but which would be reduced by the reducing agent such as alcohol, ether, etc.

It will thus be evident that I select the nature of the electrolite to suit the material being detected.

A similar result may be obtained by varying the nature of the electrode material. Chromium iron alloys or chromium nickel iron alloys are relatively inert to oxygen and to electrolites containing oxygen or the various acids containing oxygen in the radical such as sulphuric acid, chloric acid, etc. On the other hand these alloys are quite sensitive to chlorine and if they are used in electrolite relatively free from chlorine ions they will give a strong indication when air contain compounds which give chlorine ions in solutions brought into contact with the electrolite.

Therefore, in addition to the signal given by the action of the deleterious material on the electrolite I may obtain similar results by the action of the deleterious material on the electrode material.

It will be evident therefore that I may either use inert electrodes as for example carbon, platinum, gold, etc. or I may use electrodes which are relatively inert under normal conditions but which when subjected to deleterious material become quite active and generate a substantial potential difference.

In the claims I have used the term "shielded" to indicate that the electrode or electrolite thus designated is not in direct and free contact with the gas to be monitored. The shielding may be very complete as in the case of a continuous glass wall or it may be merely of a delayed type in which a porous wall is used, the shielding effect delaying the action of the gas on the interior electrolite but not preventing its eventual occurrence.

In using the term "bias" in the claims I am designating a condition which by means of an applied potential the initial potential difference between the electrodes is either neutralized or over-powered or in some other manner predetermined. One of the advantages of a bias arrangement is to cause the amplifying equipment to function in the range of maximum sensitivity. Another object of the biasing arrangement is to cause the relay or signal device to function when a definite potential difference between the electrodes is developed. This arrangement makes it possible to cause the relay to operate at a predetermined concentration of the deleterious material in the gas to be monitored.

It should be recognized that the operation of the equipment with a glass wall separating the two portions of the electrolite is similar in many respects to the operation when the electrolites are separated only by a porous wall. In the case of the glass wall separating the two electrolites or the two electrodes, this involves a much higher resistance of the total circuit which requires greater sensitivity in the amplifying equipment but in turn ordinarily gives a much more sensitive device and one which will detect smaller percentages of deleterious material.

One combination sensitive to chlorine consists of a shielded electrolite containing a strongly reducing salt such as stannous chloride with a neutral chloride such as sodium chloride and an outer or exposed electrolite containing a neutral chloride such as sodium chloride, and a hygroscopic material such as glycerol.

Having now fully described my invention, what I claim as new and desire to secure by Letters Patent in the United States is:

1. A device for monitoring gas to detect a reactive deleterious material carried by said gas to be monitored, said device consisting of a pair of electrodes, an electrolytic contacting medium forming part of the circuit between said electrodes, said electrolytic medium being reactive with said deleterious material and arranged so that a portion of said electrolite is exposed to the gas to be monitored while a second portion is separated from the gas to be monitored, by a shield formed of solid material one of said electrodes being in contact with the electrolite exposed to the gas to be monitored and one of the electrodes being in contact with the electrolite shielded from said gas to be monitored.

2. A device for monitoring gases to detect a reactive deleterious material carried by said gas to be monitored, said device consisting of a pair of electrodes, an electrolytic contacting medium reactive with said deleterious material and forming part of the circuit between said electrodes, said electrolytic medium being arranged so that a portion of said electrolite containing a hygroscopic material is exposed to the gas to be monitored while a second portion is separated from the gas to be monitored, by a shield formed of solid material one of said electrodes being in contact with the electrolite exposed to the gas to be monitored and one of the electrodes being in contact with the electrolite shielded from said gas to be monitored.

3. A device for monitoring gases to detect a reactive deleterious material carried by said gas, said device consisting of a pair of electrodes, an electrolytic contacting medium forming part of the circuit between said electrodes, said electrolytic medium being arranged so that a portion of said electrolite is reactive to said deleterious material and is exposed to the gas to be monitored while a second portion is separated from the gas to be monitored, by a shield of solid material one of said electrodes being in contact with the electrolite exposed to the gas to be monitored and one of the electrodes being in contact with the electrolite shielded from said gas to be monitored, and means responsive to the action of said reactive deleterious material on one of said pair of electrodes, said electrolite containing a hygroscopic material, and a material sensitive to the gas to be detected.

4. A device for monitoring gases to detect a reactive deleterious material carried by said gas, said device consisting of an electrode, an enclosure for said electrode keeping said gas from contact with said electrode, an electrolite within said enclosure in contact with said electrode, a second electrode without enclosure, a supply of electrolite in contact with said second electrode, said electrolite in contact with said second electrode being exposed to the gas to be monitored, a reservoir for said electrolite.

5. A device for monitoring gas comprising a portion of electrolite, means comprising a solid porous partition for shielding a portion of said electrolite, an electrode cooperating therewith, another portion of electrolite exposed to contact with said gas to be monitored, an electrolite cooperating therewith, said electrolite containing a carbonate, said electrodes and electrolites constituting a portion of a voltaic circuit.

6. A device for monitoring gas to detect a reactive deleterious material carried by said gas, said device comprising a portion of electrolite, means for shielding said portion of electrode from contact with said gas, an electrode cooperating therewith, said shielded portion of electrolite containing an oxidizing material, another portion of electrolite exposed to said gas to be monitored, an electrode cooperating therewith, said electrodes and electrolites forming a portion of a voltaic circuit.

7. A device for monitoring gas to detect a reactive deleterious material carried by said gas, said device comprising an electrode, a glass walled enclosure therefor, an electrolite within said enclosure, said enclosure preventing contact of said gas with said electrolite, an external electrode, a supply of electrolite for said external electrode exposed to the gas to be monitored, and sensitive to said deleterious material, said electrolites and electrodes forming a voltaic circuit.

8. A device for monitoring gas to detect a reactive deleterious material carried by said gas, said device including a portion of electrolite, means for shielding said portion of said electrolite from said gas, said means serving to prevent diffusion of one electrolite into the other, an electrode cooperating therewith, another portion of electrolite exposed to said gas to be monitored, an electrode cooperating therewith, said electrodes and electrolites forming a portion of a voltaic circuit, one of said electrodes being selectively sensitive to said reactive deleterious material.

9. The process of monitoring gas to detect a reactive deleterious material carried by said gas, which process consists in passing said gas in contact with one portion of electrolite in a voltaic cell and shielding a second portion of said electrolite from said gas and causing the potential of said cell to actuate an indicator.

WILLIAM A. DARRAH.